(12) United States Patent
Matsui

(10) Patent No.: US 9,625,645 B2
(45) Date of Patent: Apr. 18, 2017

(54) LARGE AREA LIGHT SOURCE

(75) Inventor: Hirokazu Matsui, Otsu (JP)

(73) Assignee: MEITAKU INDUSTRY CO., LTD., Otsu-Shi, Shiga (JP)

( * ) Notice: Subject to any disclaimer, the term of this patent is extended or adjusted under 35 U.S.C. 154(b) by 812 days.

(21) Appl. No.: 13/490,175

(22) Filed: Jun. 6, 2012

(65) Prior Publication Data

US 2013/0141941 A1    Jun. 6, 2013

(30) Foreign Application Priority Data

Jun. 10, 2011  (JP) ................................. 2011-129833

(51) Int. Cl.
    *F21V 8/00*    (2006.01)
(52) U.S. Cl.
    CPC ........... *G02B 6/009* (2013.01); *G02B 6/0073* (2013.01)
(58) Field of Classification Search
    CPC ........... F21Y 2101/02; F21Y 2103/003; F21V 21/005; F21V 23/06; F21V 17/164; F21V 21/32; F21V 7/0016; F21V 7/04; F21K 9/17; F21K 9/50; F21S 4/008; G02B 6/0073; G02B 6/009
    USPC ...... 362/219.01–217.17, 227, 230, 231, 240, 362/249.01, 249.02, 249.11, 235, 362/611–613, 218, 225, 217.01, 217.02, 362/219, 652; 445/23
    See application file for complete search history.

(56) References Cited

U.S. PATENT DOCUMENTS

| | | | |
|---|---|---|---|
| 8,132,935 B2* | 3/2012 | Park et al. | 362/235 |
| 8,297,788 B2* | 10/2012 | Bishop | 362/249.02 |
| 2002/0101399 A1* | 8/2002 | Kubo et al. | 345/104 |
| 2003/0071581 A1* | 4/2003 | Panagotacos | F21V 5/04 315/185 R |
| 2012/0146543 A1* | 6/2012 | Jang | H01R 12/721 315/294 |

FOREIGN PATENT DOCUMENTS

| | | |
|---|---|---|
| CN | 101578475 A | 11/2009 |
| CN | 101960205 A | 1/2011 |
| JP | 2008198398 A | 8/2008 |
| JP | 2009099546 A | 5/2009 |
| JP | 2011-096506 A | 5/2011 |

OTHER PUBLICATIONS

State Intellectual Property Office of People's Republic of China, Office Action and Search Report, Application No. 201210189548.6, Feb. 2, 2015, 8 pages.

* cited by examiner

*Primary Examiner* — Stephen F Husar
(74) *Attorney, Agent, or Firm* — Quarles & Brady LLP

(57) ABSTRACT

A large area light source includes a narrow space of several millimeters long arranged between adjacent ends of circuit boards of LED bars that are arranged in series in their longitudinal direction, and one end or both ends of a connecting pin is attached movable in its longitudinal direction to a coupling terminal arranged on an end of the circuit board of the LED bar, the LED bar is attached movable in its longitudinal direction to its holder. Even if deformation of distortion, bending, or strain is induced by transportation, installation, or use of the area light source, the movable LED bar as well as the connecting pin absorbs expansion and contraction stress working between the adjacent ends of the circuit boards to securely prevent such breaking of wire incurred by use of a plurality of divided LED bars.

4 Claims, 3 Drawing Sheets

LARGE AREA LIGHT SOURCE

CROSS REFERENCE TO RELATED APPLICATION

The priority application Japan Patent Application No. 2011-129833 upon which this patent application is based is hereby incorporated by reference.

TECHNICAL FIELD

This invention relates to a large area light source configured to be used for backlighting a positive film.

BACKGROUND ART

Japanese Patent Application Laid-Open Publication No. 2011-96, 506 discloses such a large area light source, on which a positive film indicating a time table in the station, a guide in an open space at the front of the building or on the building wall, an advertisement and so on is arranged, and which is formed about 1 meter long by 2 meters wide, whereby a plurality of LED bars divided in its longitudinal direction is arranged in series in a heat dissipation base, and an incident light is guided into an incident light edge of its light guide plate. The arrangement of the LED bars in series in a heat dissipation base is made by integrally forming a holder of the LED bar in cross-sectional L-shape using extruded aluminum, including a light source holder C-shaped in cross section that opens toward incident light edge of the light guide plate, and an upstand that is made as a seat for the heat dissipation plate and a support plate back the light guide plate on the back of the light source holder to dissipate heat from the holder of the LED bars. The area light source is integrated by threading screw either from the light source holder into the light guide plate via an unloaded hole through the support circuit board, or from a flame arranged outside into the light guide plate via a lace hole of the light holder and the unloaded hole of the support circuit board. This configuration makes it possible to absorb heat shrink of the light guide plate that is subjective to direct daylight. The LED bars are arranged in series in the heat dissipation base by inserting the LED bars into a C-shaped slit of the light source holder and infilling such a spacer between the circuit board of the LED bars and the opposite projection positioned at the incident light edge of the light source holder, and the LED bars are electrically connected to each other either using a connector or soldering lead wire, generally, soldering electrodes of ends of the adjacent LED bars in series.

CITATION LIST

Patent Literature

[PTL 1] Japanese Patent Application Laid-Open Publication No. 2011-96, 506

SUMMARY OF INVENTION

Technical Problem

The large area light source can, as mentioned above, enhance display impact by back-lighting the positive film with the light guide plate, such as the above-mentioned time table in the station, the guide plate, and the advertizing display, and further absorb heat shrink caused by synthetic resin of the light guide plate so as to prevent any trouble caused by the heat shrink, i.e., fracture or damage at the circuit board of the LED bars or connection portion. Disadvantageously, it is also required to make an area light source as thinner as possible despite its largeness. This thus makes it difficult to secure the stable freestanding large light guide plate because of further thinning of the light guide plate, e.g., several millimeters thin, such as 5 mm. Even if the large area light source is reinforced structurally, deformation such as distortion, bending, or strain of the light guide plate may be induced upon transportation or installation or use for display, which highly likely incurs the above-mentioned fracture or damage at the circuit board of the LED bars or the connection portion. Furthermore, upon electrically connecting the electrodes to each other by soldering, it is likely to incur fracture or damage at the connection portion of soldering.

An object of the present invention is, in view of the above, to provide a large area light source overcoming possible deficiencies, such as fracture or damage at the electric connection portion of the LED bars arranged in series that possibly induces, due to its largeness, deformation such as distortion, bending, or strain of the area light source.

Solution to Problem

To attain the object, the present invention is designed to overcome possible fracture or damage due to its largeness as much as possible at the electric connection portion of the LED bars arranged in series, by absorbing expansion and contraction stress induced between the ends of the circuit board of the LED bars arranged in series.

A first aspect according to the invention provides a large area light source guiding an incident light into an incident light edge of its light guide plate, comprising a plurality of LED bars divided in a longitudinal direction, each of the LED bars including circuit board, and a heat dissipation base accommodating the LED bars in series, whereby the plurality of LED bars are coupled to each other in a manner to absorb expansion and contraction stress within adjacent ends of the circuit boards, the expansion and contraction stress working between the adjacent ends of the circuit boards in a serial direction, and induced by deformation of distortion, bending, or strain of the light guide plate.

Preferably, according to another aspect of the present invention, the large area light source further comprises a connecting pin for electrically connecting the adjacent ends of the circuit boards to each other, the connecting pin being attached across a narrow space between the adjacent ends of the circuit boards of the LED bars to couple the LED bars to each other, and attached to at least one of the adjacent ends of the circuit boards movably in the longitudinal direction of the LED bars.

Preferably, according to another aspect of the present invention, the large area light source further comprises a connecting pin for electrically connecting the adjacent ends of the circuit boards to each other, the connecting pin being attached across a narrow space between the adjacent ends of the circuit boards of the LED bars to couple the LED bars to each other, one end the of the connecting pin being fixed to one of the adjacent ends of the circuit boards, and the other end of the connecting pin being arranged to elastically abut onto the other of the adjacent ends of the circuit boards Preferably, according to another aspect of the present invention, the large area light source further comprises a connecting pin for electrically connecting the adjacent ends of the circuit boards to each other, the connecting pin being attached across a narrow space between the adjacent ends of the circuit boards of the LED bars to couple the LED bars to each other, and the connecting pin being formed longer than the narrow space and bent between the ends of the circuit boards.

Preferably, according to another aspect of the present invention, the large area light source further comprises a coupling terminal disposed on the circuit board of the LED bars to attach the connecting pin.

Preferably, according to another aspect of the present invention, the large area light source further comprises at least one of a cover and a contact member to elastically abut onto the incident light edge of the light guide plate, attached to the connecting pin, and the contact member being positioned at a middle of the connecting pin in the longitudinal direction, wherein the connecting pin is elastically pressed against the circuit board of the LED bars to be elastically held in position.

Preferably, according to another aspect of the present invention, the LED bars are arranged movable in the heat dissipation base in the serial direction to reduce absorption amount of the expansion and contraction stress between the ends of the circuit boards of the LED bars.

Accordingly, the invention is designed to include aforementioned subject matter as measure to resolve abovementioned problems.

Advantageous Effects of Invention

Since the invention according to the first aspect is configured such as mentioned above, it is made possible, by absorbing expansion and contraction stress between the ends of the circuit boards of the LED bars arranged in series, to provide a large area light source overcoming possible fracture or damage due to its largeness as much as possible at the electric connection portion of the LED bars arranged in series.

According to another aspect of the present invention, since, in addition to what is mentioned above, the LED bars are coupled across a narrow space between the adjacent ends of the circuit board of the LED bars, a connecting pin for electrically connecting between the adjacent ends of the circuit board is attached across the narrow space, the connecting pin is attached movable in a longitudinal direction of the LED bars onto at least one of the adjacent ends of the circuit boards, it is made possible to prevent movement of the LED bars and connecting pin together, keep electric connection by the connecting pin upon expansion and contraction stress acting, and securely absorb the expansion and contraction stress between the ends of the circuit boards.

According to another aspect of the present invention, since, in addition to what is mentioned above, the LED bars are coupled across a narrow space between the adjacent ends of the circuit boards of the LED bars, a connecting pin for electrically connecting between the adjacent ends of the circuit boards is attached across the narrow space, one end of the connecting pin is fixed to one of the adjacent ends of the circuit boards, the other end of the connecting pin is arranged to elastically abut onto the other of the adjacent ends of the circuit boards, it is made possible to prevent movement of the LED bars and connecting pin together, keep electric connection by the connecting pin upon expansion and contraction stress acting, and securely absorb the expansion and contraction stress between the ends of the circuit boards.

According to another aspect of the present invention, since, in addition to what is mentioned above, the LED bars are coupled across a narrow space between the adjacent ends of the circuit boards of the LED bars, a connecting pin for electrically connecting between the adjacent ends of the circuit boards is attached across the narrow space, the connecting pin is formed longer than the narrow space, and formed bent between the ends of the circuit boards, it is made possible to prevent movement of the LED bars and connecting pin together, keep electric connection by the connecting pin upon expansion and contraction stress acting, and securely absorb the expansion and contraction stress between the ends of the circuit boards.

According to another aspect of the present invention, since, in addition to what is mentioned above, the connecting pin is attached using a coupling terminal disposed on the circuit board of the LED bars, it is made possible to attach the connecting pin using the coupling terminal as easily and securely as possible.

According to another aspect of the present invention, since, in addition to what is mentioned above, at least one of a cover elastically abutting onto to the incident light edge of the light guide plate, and a contact member attached at a lengthwise middle of the connecting pin is attached to the connecting pin, the connecting pin being held in position by elastically pressing the connecting pin toward the circuit board of the LED bars, it is made possible to effect absorbing the expansion and contraction stress.

According to another aspect of the present invention, since, in addition to what is mentioned above, the LED bars are arranged in series movable on the heat dissipation base, so as to reduce absorption amount of the expansion and contraction stress between the ends of the circuit boards of the LED bars, it is made possible further to reduce possible fracture or damage of the electric connection portion of the LED bars.

BRIEF DESCRIPTION OF DRAWINGS

For a fuller understanding of the nature and desired objects of the present invention, reference is made to the following detailed description taken in conjunction with the accompanying drawing figures wherein like reference characters denote corresponding parts throughout the several views and wherein.

DESCRIPTION OF EMBODIMENTS

Figure 1:
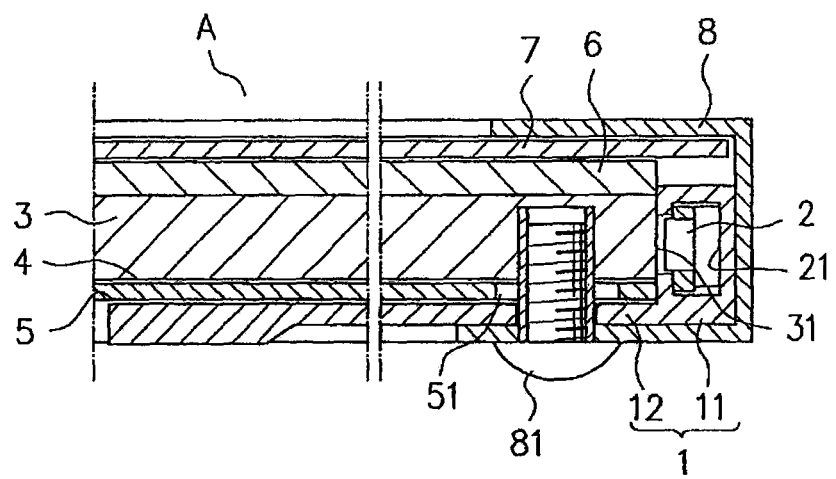
FIG. 1 is a partial cross-sectional view of a large area light source device.
Figure 2:
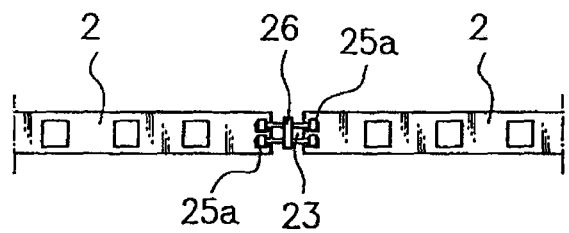
FIG. 2 is a partial plane view depicting arrangement of an LED bars.
Figure 3:
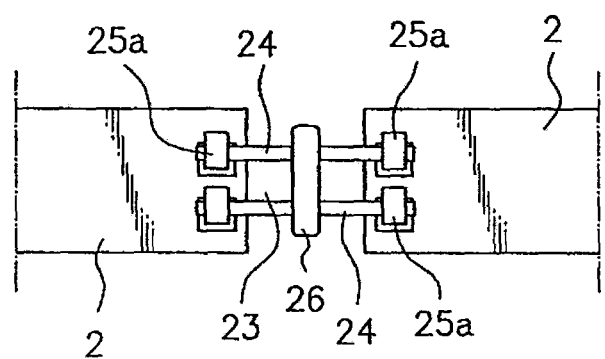
FIG. 3 is a partial enlarged plane view of FIG. 2.
Figure 4:
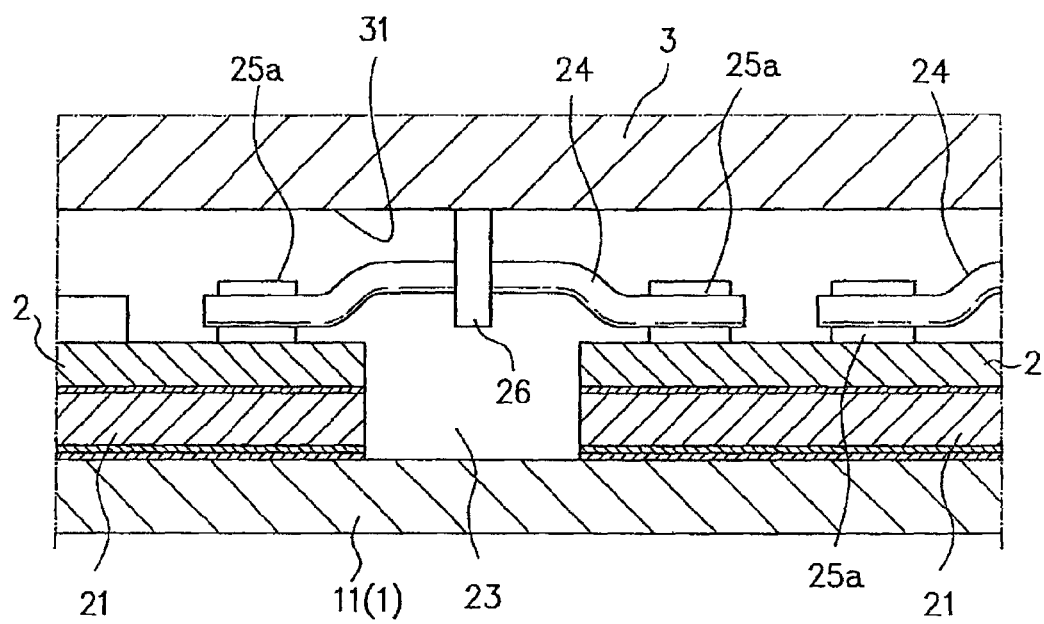
FIG. 4 is an enlarged front view depicting connection portion of the LED bars.
Figure 5:
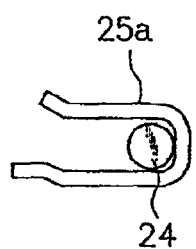
FIG. 5 is a longitudinal section view depicting relation of a coupling terminal and a connecting pin.

The invention will hereafter be discussed more specifically according to the accompanying drawings. Referring to FIGS. 1 to 5, a large area light source A includes a plurality of LED bars 2 arranged in series in a heart dissipation base 1, so as to provide an incident light into incident edge 31 of a light guide plate 3. The above-mentioned LED bars 2 are coupled to absorb expansion and contraction stress within ends of a circuit board, which works between the adjacent ends of the circuit boards of the LED bars 2 in series, and is caused by deformation such as distortion, bending, or strain of the light guide plate 3.

The area light source device A according to the present embodiment is formed oblong or square, e.g., from 420 by 594 millimeters to 1 by 2 meters or more in size, utilized for a time table in the station, a guide display, and such an advertizing display. The large area light source A is designed to back-light a positive film for display such as the time table by guiding an incident light of the LED bars 2 arranged in series divided plural to an incident light edge 31 arranged in an opposite pair or two outer circumferential pairs of the light guide plate 3.

The area light source A is provided with: a heat dissipation base 1 arranged every the incident light edge 31; a plurality of divided LED bars 2 arranged in series in the heat dissipation base 1; a large light guide plate 3; a reflector plate 4 arranged back the light guide plate 3; a support plate 5 arranged back the reflector 4; a light diffuser 6 arranged in front of the light guide plate 3; a transparent panel 7 putting the positive film therein in front of the light diffuser 6; and a panel frame 8 covering outside the heat dissipation base 1 and the transparent panel 7.

The heat dissipation base 1 of the present embodiment is formed of aluminum extrusion material, in cross-sectional L-shape, integral with a light source holder 11 having a nearly cross-sectional C-shaped LED bar housing open toward the light incident edge 31 side of the light guide plate 3, and an upstand 12 back the light source holder 11 for dissipating heat of the LED bars, made as a seat receiving the support plate 5. The light guide plate 3 is made of transparent resin such as acrylic, several millimeters thick, e.g., about 5 millimeters thick, with light guide pattern being screen-printed or molded on its back. The reflector 4 is made from white resin thin sheet with high reflection rate, the support plate 5 aluminum plate, the light diffuser 6 opaque white resin thin sheet with high transparency, the transparent panel 7 transparent resin acrylic similar to the light guide plate, the panel frame 8 aluminum extrusion material which is bracket-shaped in cross-section and has a thickness for accommodating these above.

The reflector plate 4, the support plate 5, the diffuser 6, and the transparent panel 7 each have nearly the same area as the light guide plate 3. The heat dissipation base 1 is in about 1 cm thickness, 10 cm height, and nearly the same length as the light guide 3. The panel frame 8 is 1 to 1.5 cm thick including a thickness of the transparent panel 7, several centimeters high, and nearly the same length as the light guide 3.

In the area light source device A, the reflector 4, the light guide late 3, and the light diffuser 6 are stacked on a front side of the support plate 5, and the light source holder 11 accommodating the LED bar 2 in its LED bar housing is arranged so as to turn its opening toward the incident light edge 31 opposite to the light guide plate 3. The transplant panel 7 is arranged on a surface of the light diffuser 6, and the circumferential panel frame 8 is arranged around all outer circumferences. Further threading a plurality of screws 81 into the light guide plate 3 in its longitudinal direction from the panel frame 8 via the upstand 12 of the heat dissipation base 1 and the support plate 5 makes these integrated. The support plate 5 has an unloaded hole to make the screw 81 movable so as to become adapted for heat shrink of the large light guide plate 3.

The area light source A of the present embodiment as such formed is made so thin in whole as about 1 cm thick, or no more than 1.5 cm or more thick at the plate frame 8.

The LED bars 2 arranged in the light holder 11 of the heat dissipation base 1 are made such that a long circuit board, e.g., about 30 cm long where a plurality of LED chips are arranged is divided plural with its length of the same or less as that of the incident light edge 31 of the light guide plate 3, and are coupled to absorb expansion and contraction stress within the ends of the circuit boards, which is physical load incurred by expansion and contraction of the circuit board, and may be caused by deformation such as distortion, bending, or strain of area light source, or specifically the light guide plate 3. According to the present embodiment, the LED bars are coupled to absorb the expansion and contraction stress within the ends of the circuit boards such that a narrow space 23 is located between the ends of the circuit boards of the LED bars, a connecting pin 24 for electrically bridging the narrow space 23 between the adjacent ends of the circuit boards is attached, and the connecting pin 24 is attached movable in a longitudinal direction of the LED bars 2 to at least one of the adjacent ends of the circuit boards. Furthermore, the connecting pin 24 is attached using a coupling terminal 25a arranged on the circuit board of the LED bar 2.

More specifically, the LED bars 2 makes the narrow space 23 located between the ends of the circuit boards, e.g., several millimeters (2 to 5 mm) long, and also makes itself inserted into and across the light source holder 11 of the heat dissipation base 1 in its longitudinal direction, whereby in each of the LED bars 2, the connecting terminal 25a is made arranged at the end of the circuit board to hold the connecting pin 24 thereon so as to connect the ends of the circuit boards to each other.

The coupling terminal 25a is formed through conductive metal being bent into cross-sectional C-shape, bracket-shape, or U-shape (adapted to the present embodiment), to receive the connecting pin 24 by arranging its opening in an intersectional direction of the LED bars, and conforming the height of an inside of the opening to an outline of the connecting pin 24. Further, the coupling terminal 25a is fixed to each of the ends of the circuit boards of the LED bars so as to turn its opening in a back or forth direction of the area light source A, the connecting pin 24 is passed through the coupling terminal 25a to be slidably inserted into in a longitudinal direction of the LED bars 2 and held, achieving such movable arrangement above. Further, the coupling terminal 25a is bent or curved so as to turn its opening of upper side upwardly to broaden its opening, making insertion of the connecting pin 24 ready and secure, which facilitates coupling workability of the LED bars 2.

The connecting pin 24 is a wave or straight pin made from conductive metal with both hardness and flexibility, e.g., copper wire. More specifically, this embodiment employs a wave pin about 1 to 2 cm long in whole, formed bent so that a middle thereof, e.g., about 5 mm long, in its longitudinal direction is uplifted, and each of both ends, e.g., about 2 to 3 mm long, in its longitudinal direction is straightened. This makes the connecting pin 24 have elasticity of the above-mentioned conductive material and shape retention by its elasticity without deformation or buckling induced by deformation.

The connecting pin 24 in the present embodiment is arranged movable relative to the coupling terminal 25a so that lateral pairs of the coupling terminals 25a is vertically arranged at both the adjacent ends of the LED bars 2 in its longitudinal direction, each of the straight portion of the pair of the connecting pin 24 is inserted into, and held by, the lateral coupling terminals 25a arranged at the both ends of the circuit boards, the uplifted portion is arranged between the coupling terminals 25a to project further upwardly than the coupling terminal 25a by what is uplifted. The connecting pin 24 is thereby inserted in, and held by, the coupling terminal 25a so as to be movable at two points in its longitudinal direction, i.e., the straight portions of both the ends.

Further, the connecting pin 24 is attached to elastically press the circuit board of the LED bars 2 and be held in position whereby a cover 27 to be abutted onto the incident light edge 31 of the light guide plate 3, or a contact member 26 (adapted to the preset embodiment) arranged at a middle of the connecting pin 24 in its longitudinal direction is attached to the connecting pin 24.

In the present embodiment, the contact member 26 is made from plane strip cushion of, e.g., open-cell form resin shaped circular or rectangular in cross-section, the contact member 26 is arranged to receive the connecting pin 24 so as to hold the pair of the connecting pins 24 at the middle of the pair of connecting pins 24 in its longitudinal direction, and one contact member 26 is arranged between every the circuit boards of the LED bars 2, allowing for elastic contact against the incident light edge 31 of the light guide plate 3. Such attachment of the contact member 26 to the pair of connecting pins 24 and coupling of the pair of connecting pins allows the pair of connecting pins 24 to be coinstantaneously inserted into, and held by the coupling terminal 25a in a back or forth direction that opens toward one of the back and forth direction mentioned above, leading to improving workability of insertion and hole as easy as possible.

In the contact member 26, its outer end projecting outwardly from the uplifted portion of the connecting pin 24 elastically abuts onto the incident light edge 31 of the light guide plate 3, and the connecting pin 24 that holds the contact member 26 is elastically pressed toward the coupling terminal 25a. This allows the connecting pin 24 to be in position to slightly press itself against the circuit board, and the straight portion in the present embodiment forcibly to be pressed against inner opening of the coupling terminal 25a so as to secure the connecting pin 24 to the coupling terminal 25a.

Further, in the area light source A, absorption load of the expansion and contraction stress between the ends of the circuit boards of the LED bars 2 is reduced by the LED bars being movably arranged in the heat dissipation base 1. Namely, in the present embodiment, the LED bars 2 is accommodated in the LED bar housing C-shaped in cross-section of the heat dissipation base 1, the LED bar housing is formed slightly deeper than the thickness of the LED bars 2, a strip member 21 made of heat-conductive material, for example, polyimide resin with its thickness corresponding to difference between its thickness and its depth is made to adhere to a back of the circuit board of the LED bars 2, and the LED bars 2 integral with the strip 21 is accommodated in the LED bar housing 21. This thereby allows in the present embodiment the LED bars 2 to be arranged movable in its longitudinal direction in the heat dissipation base 1 or the light source holder 11, and thus the LED bars 2 to be arranged slidable in its longitudinal direction of the light source holder 11.

Accordingly, when expansion and contraction stress between the ends of the circuit boards of the LED bars 2 arranged between the narrow space 23 works by possible deformation such as distortion, bending, or strain that the area light source A may suffer from upon transportation, installation, or use conditions of the area light source A, then the connecting pin 24, while inserted in, and held by, the coupling terminal 25a, keeping its electric connection, can slidably move in its longitudinal direction of the LED bars 2. This makes it possible to absorb the stress of the narrow space of the LED bars 2 without movement of the LED bars 2 and the connecting pin 24 together, which can prevent fraction of damage to the connecting pin 24 effectively and securely and resolve possible adverse effect of electric connection of the LED bars 2 divided plural. Further, arranging in series the LED bars 2 movably relative to the heat dissipation base 1 allows expansion and contraction stress working between the ends of the circuit boards of the LED bars 2 to reduce as further as possible, and thereby possibility of fracture or damage at the electric connection portion of the LED bars 2 further to eliminate.

Figure 6:
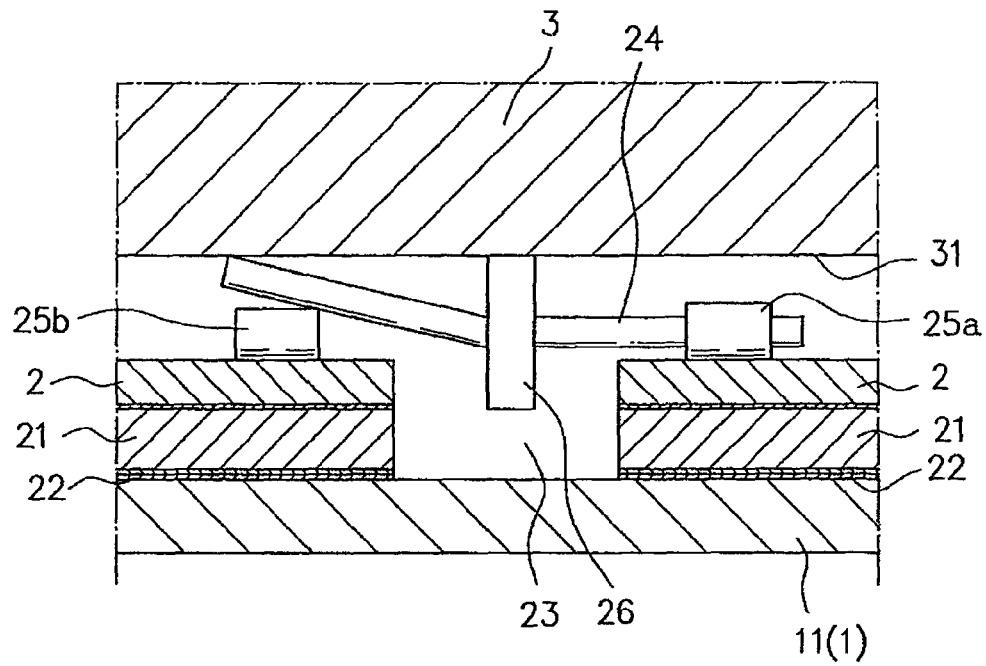
FIG. 6 is an enlarged side view depicting connection portion of the LED bars according to another embodiment.
Figure 7:
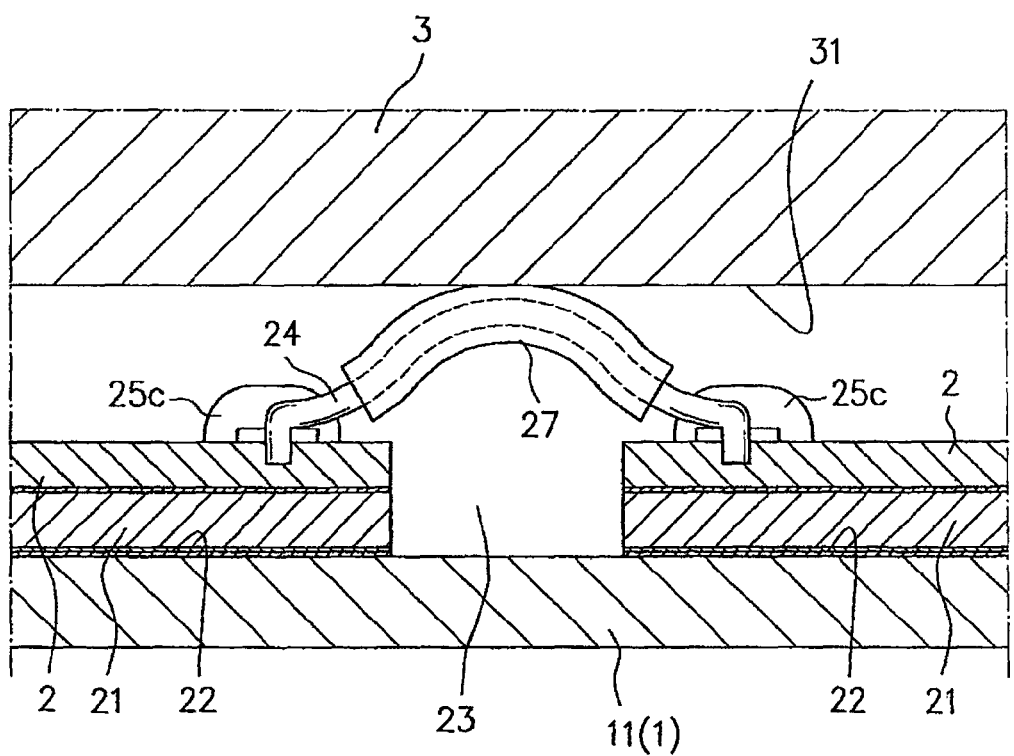
FIG. 7 is an enlarged side view depicting connection portion of the LED bars according to another embodiment.

FIGS. 6 and 7 show another embodiment, respectively. More specifically, FIG. 6 exemplifies an arrangement in which the LED bars 2 are coupled across the narrow space 23 between the ends of the circuit board of the LED bars, the connecting pin 24 to electrically connect the ends of the circuit boards is attached across the narrow space 23, and the connecting pin 24 is fixed to one of the ends of the circuit boards, and is abutted elastically and upwardly onto the other of the ends of the circuit boards. In the present embodiment, the coupling terminal 25a is arranged on one of the ends of the circuit boards of the LED bars 2, an electrode 25b is arranged exposed on the other of the ends, one end of the connecting pin 24 in its lengthwise direction is fixed to the coupling terminal 25a, and the other end is attached elastically abutting onto the electrode 25b, leading to coupling the LED bars. Further, the connecting pin 24 is formed, of conductive material, into bent pin shape as is mentioned above, such as, S-shape or angled bracket shape in its longitudinal direction, so as to secure contact of the connecting pin 24 to the exposed electrode 25b of the other end by employing such the bent pin. Further, arrangement of the contact member 26 in the middle in its longitudinal direction as is mentioned above to hold the connecting pin 24 in position allows its contact to the electrode 25b to be elastic, leading to further securing its contact.

The coupling terminal 25a for fixing the one end of the connecting pin 24 in its lengthwise direction is made such that the coupling terminal can be employed by providing fixture therein. Further, The coupling terminal 25a is made suitable such that one end of the connecting pin 24 is welded, or soldered, and a connecting pin receipt groove, an insertion bore are arranged to receive and hold.

FIG. 7 exemplifies an arrangement in which the narrow space 23 is arranged between the ends of the LED bars 2, the connecting pin 24 electrically bridging the narrow space 23 between the adjacent ends of the circuit boards is attached, and the connecting pin 24 is made longer than the narrow space 23 to be arranged bent between the ends of the circuit boards. Further it is exemplified that in the present embodiment each both ends of the connecting pin 24 in the lengthwise direction is fixed to the circuit board of the LED bars 2, the connecting pin 24 is arranged longer than the narrow space 23, and thereby the connecting pin 24 is arranged bent in an inversed U-shape between the ends. Further, the connecting pin 24 can be fixed to the electrode or the coupling terminal arranged between the ends of the LED bars, whereby the connecting pin 24 in the present embodiment is fixed by soldering to the exposed electrode 25c, the connecting pin 24 is covered in whole by the cover 27 instead of the contact member, and a middle of the cover 27 is elastically abutted onto the incident light edge 31 of the light guide plate 3 to hold itself in position in the same way as does the contact member 27 using elasticity of material of the cover 27 such as flexible synthetic resin. This makes it possible to prevent swing of the connecting pin 24 that is arranged bent, to protect the fixing portion of soldering 25c, and to secure electric connection.

Furthermore, in these examples of FIGS. 6 and 7, by arrangement in which the connecting pin 24 is fixed to one end of the circuit board, and abutted onto the other end elastically and upwardly, or is made longer than the narrow space 23 to be arranged bent between the ends of the circuit boards, the stress as mentioned above is absorbed in the narrow space 23 of the LED bars 2, and further by movable arrangement in series of the heat dissipation base 1 of the LED bars 2, the adverse effect that works between the ends of the circuit boards of the LED bars can be reduced as much as possible.

It should be noted that the remaining aspects of the FIGS. 6 and 7 are the same as the examples mentioned above, and like elements have the like reference signs, detailed description of which is not repeated here.

Although the present invention has been fully described by way of example with reference to the accompanying drawings, it is to be understood that various changes and modifications will be apparent to those skilled in the art such that the heat dissipation base may be made capable of receiving LED bar such C-shaped in cross-section as just heat dissipation feature, or the strait pin is employed instead of the wave pin by thickening the pin to secure its contact to the incident light edge of the light guide plate. Therefore, unless otherwise such changes and modifications depart from the scope of the present invention hereinafter defined, they should be construed as being included therein.

REFERENCE SIGNS LIST

A area light source device
1 heat dissipation base
11 light source holder
12 upstand
2 LED bar
21 strip member
22 film
23 narrow space
24 connecting pin
25a coupling terminal
25b electrode
25c soldering
26 contact member
27 cover
3 light guide plate
31 incident light edge
4 reflector plate
5 support plate
51 unloaded hole
6 light diffuser
7 transparent panel
8 panel frame
81 screw

The invention claimed is:

1. A large area light source comprising:
a light guide plate;
a plurality of light emitting diode (LED) bars divided in a longitudinal direction thereof, each of the LED bars including a circuit board, the plurality of LED bars being arranged along an incident light edge of the light guide plate;
a heat dissipation base accommodating the LED bars in series, and
a connecting pin for electrically connecting the adjacent ends of the circuit boards to each other, the connecting pin being arranged to bridge a narrow space between the adjacent ends of the circuit boards of the LED bars to couple the LED bars to each other, the connecting pin being formed longer than the narrow space and bent into an inverted U shape extending upward toward the incident light edge of the light guide plate between the ends of the circuit boards,
wherein the plurality of LED bars are coupled to each other in a manner to absorb expansion and contraction stress within adjacent ends of the circuit boards, the expansion and contraction stress working between the adjacent ends of the circuit boards in a serial direction thereof, and being induced by deformation of distortion, bending, or strain of the light guide plate, and the LED bars are arranged movable in the heat dissipation base in the serial direction so as to reduce absorption amount of the expansion and contraction stress between the ends of the circuit boards of the LED bars.

2. The large area light source according to claim 1, further comprising a coupling terminal disposed on the circuit board of the LED bars to attach the connecting pin.

3. The large area light source according to claim 1, wherein the connecting pin comprises a contact member longitudinally centered on the connecting pin and attached to the connecting pin so as to elastically abut onto the incident light edge of the light guide plate, wherein the connecting pin is elastically pressed against the circuit board of the LED bars to be elastically held in position.

4. The large area light source according to claim 2, wherein the connecting pin comprises a contact member longitudinally centered on the connecting pin and attached to the connecting pin so as to elastically abut onto the incident light edge of the light guide plate, wherein the connecting pin is elastically pressed against the circuit board of the LED bars to be elastically held in position.

* * * * *